United States Patent
Stanhope

(10) Patent No.: US 11,738,362 B2
(45) Date of Patent: Aug. 29, 2023

(54) SYSTEM AND METHOD FOR MONITORING AGRICULTURAL SPRAYER OPERATION USING SPRAY FAN SHAPE

(71) Applicant: CNH Industrial America LLC, New Holland, PA (US)

(72) Inventor: Trevor Stanhope, Palos Hills, IL (US)

(73) Assignee: CNH Industrial America LLC, New Holland, PA (US)

( * ) Notice: Subject to any disclaimer, the term of this patent is extended or adjusted under 35 U.S.C. 154(b) by 304 days.

(21) Appl. No.: 16/839,285

(22) Filed: Apr. 3, 2020

(65) Prior Publication Data
US 2021/0308708 A1    Oct. 7, 2021

(51) Int. Cl.
| | |
|---|---|
| *B05B 12/08* | (2006.01) |
| *B05B 1/20* | (2006.01) |
| *A01C 23/04* | (2006.01) |
| *A01M 7/00* | (2006.01) |
| *A01C 23/00* | (2006.01) |

(52) U.S. Cl.
CPC .......... *B05B 12/082* (2013.01); *A01C 23/007* (2013.01); *A01C 23/047* (2013.01); *A01M 7/0042* (2013.01); *A01M 7/0089* (2013.01); *B05B 1/20* (2013.01)

(58) Field of Classification Search
CPC . A01M 7/0089; A01M 7/0042; A01C 23/047; A01C 23/007; B05B 1/20; B05B 12/082; A01B 79/005; G01N 15/0227; G06T 7/60–62
See application file for complete search history.

(56) References Cited

U.S. PATENT DOCUMENTS

| | | |
|---|---|---|
| 8,134,703 B2 | 3/2012 | Sivathanu et al. |
| 8,454,245 B2 | 6/2013 | Overskeid et al. |
| (Continued) | | |

FOREIGN PATENT DOCUMENTS

| | | |
|---|---|---|
| CN | 2640617 Y | 9/2004 |
| CN | 107581175 A | 1/2018 |
| JP | 2015154274 A | 8/2015 |

OTHER PUBLICATIONS

AgCam, Dakota Micro, Inc., 2009 (31 pages) http://www.freedomfarmsagcam.com/agcam_downloads/AgCam_Photo_Album.pdf http://dakotamicro.com/docs/EnduraCam-Photo-Album.pdf.

*Primary Examiner* — Tuongminh N Pham
(74) *Attorney, Agent, or Firm* — Rebecca Henkel; Rickard Demille

(57) ABSTRACT

A system for monitoring agricultural sprayer operation includes a boom and a nozzle mounted on the boom, with the nozzle configured to dispense a fan of an agricultural fluid as the agricultural sprayer travels across a field. Additionally, the system includes an imaging device configured to capture image data depicting the dispensed fan of the agricultural fluid and a controller communicatively coupled to the imaging device. The controller is, in turn, configured to analyze the captured image data to determine a parameter associated with a shape of the dispensed spray fan. Moreover, the controller is configured to compare the determined parameter to a predetermined parameter range. Furthermore, the controller is configured to; and initiate a control action when the determined parameter falls outside of a predetermined parameter range.

16 Claims, 6 Drawing Sheets

(56) References Cited

U.S. PATENT DOCUMENTS

| | | | |
|---|---|---|---|
| 8,488,874 | B2 | 7/2013 | Zaman et al. |
| 9,824,438 | B2 | 11/2017 | Reichhardt |
| 10,098,273 | B2 | 10/2018 | Redden et al. |
| 10,255,670 | B1 | 4/2019 | Wu et al. |
| 2005/0000277 | A1* | 1/2005 | Giles .................. A01M 7/0089 73/114.51 |
| 2005/0023367 | A1* | 2/2005 | Reighard ................ B05B 15/50 239/71 |
| 2006/0271262 | A1 | 11/2006 | McLain, III |
| 2010/0225912 | A1* | 9/2010 | Sivathanu ........... G01M 99/008 356/336 |
| 2016/0368011 | A1 | 12/2016 | Feldhaus et al. |
| 2017/0071188 | A1 | 3/2017 | Rees |
| 2018/0052088 | A1 | 2/2018 | Sarkar et al. |
| 2019/0150357 | A1* | 5/2019 | Wu .......................... G06T 7/73 |
| 2020/0270805 | A1* | 8/2020 | Burgess ................ D06M 23/06 |

* cited by examiner

SYSTEM AND METHOD FOR MONITORING AGRICULTURAL SPRAYER OPERATION USING SPRAY FAN SHAPE

FIELD OF THE INVENTION

The present disclosure generally relates to agricultural sprayers and, more particularly, to systems and methods for monitoring the operation of an agricultural sprayer using spray fan shape.

BACKGROUND OF THE INVENTION

Agricultural sprayers apply an agricultural fluid (e.g., a pesticide) onto crops as the sprayer is traveling across a field. In general, the agricultural fluid is applied at a target application rate to achieve a desired agricultural outcome (e.g., a reduction in weed coverage or pest activity). As such, a typical sprayer includes a boom assembly on which a plurality of spaced apart nozzles is mounted. Each nozzle is, in turn, configured to dispense or otherwise spray the agricultural fluid onto underlying crops and/or weeds at the target application rate. However, during operation, the nozzles may become damaged and/or occluded, thereby impeding the flow of the agricultural substance through the nozzle. In such instances, the target application rate of the agricultural substance is not met, and the desired agricultural outcome may not be achieved.

Accordingly, an improved system and method for monitoring the operation of an agricultural sprayer would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a system for monitoring agricultural sprayer operation. The system includes a boom and a nozzle mounted on the boom, with the nozzle configured to dispense a fan of an agricultural fluid as the agricultural sprayer travels across a field. Additionally, the system includes an imaging device configured to capture image data depicting the dispensed fan of the agricultural fluid and a controller communicatively coupled to the imaging device. The controller is, in turn, configured to analyze the captured image data to determine a parameter associated with a shape of the dispensed spray fan. Moreover, the controller is configured to compare the determined parameter to a predetermined parameter range. Furthermore, the controller is configured to initiate a control action when the determined parameter falls outside of a predetermined parameter range.

In another aspect, the present subject matter is directed to a method for monitoring an operation of an agricultural sprayer. The agricultural sprayer, in turn, includes a nozzle configured to dispense a fan of an agricultural fluid as the agricultural sprayer travels across a field. The method includes receiving, with one or more computing devices, image data depicting the dispensed fan of the agricultural fluid. Moreover, the method includes analyzing, with the one or more computing devices, the received image data to determine a parameter associated with a shape of the dispensed spray fan. Furthermore, the method includes comparing, with the one or more computing devices, the determined parameter to a predetermined parameter range. Additionally, the method includes initiating, with the one or more computing devices, a control action when the determined parameter falls outside of a predetermined parameter range.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
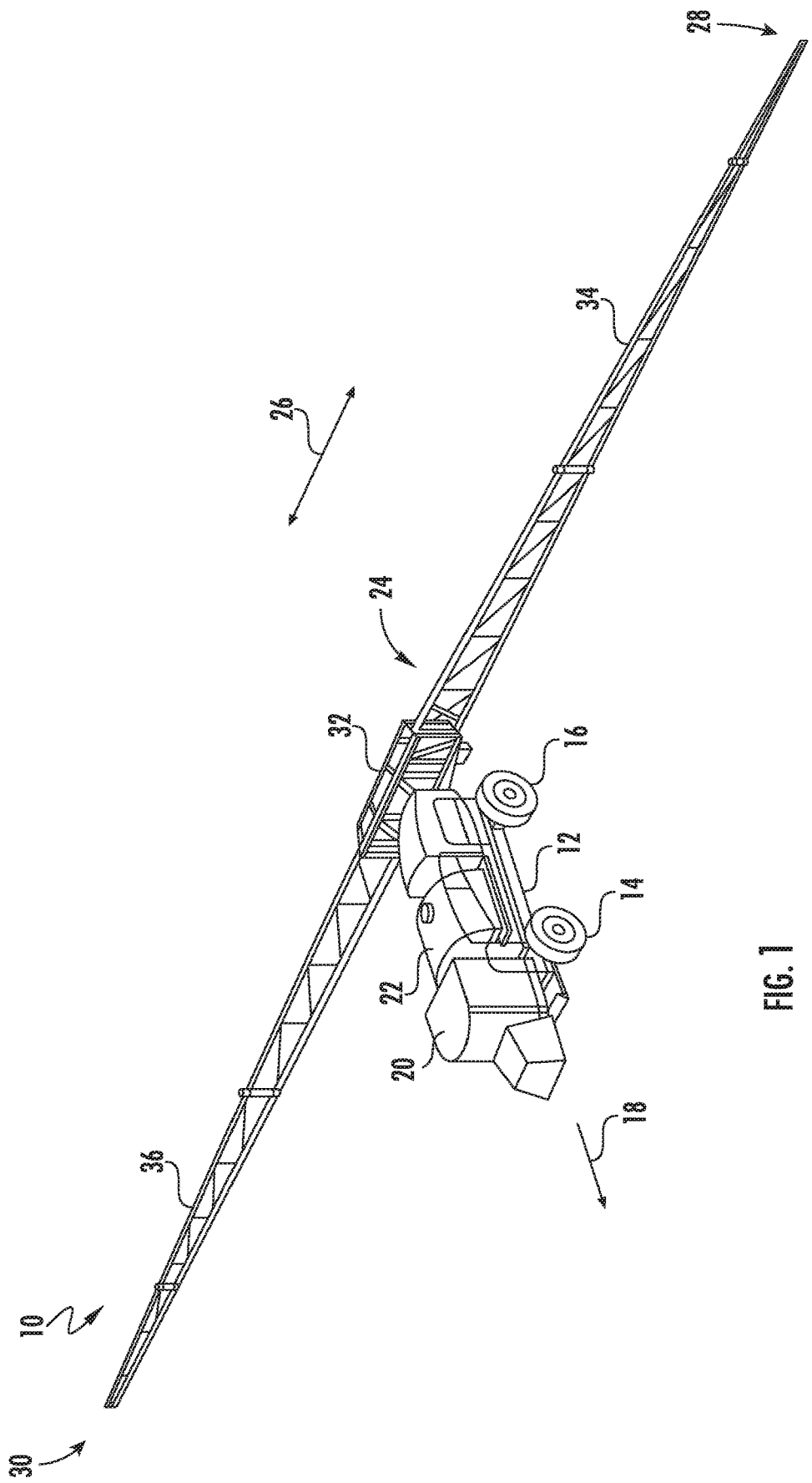
FIG. 1 illustrates a perspective view of one embodiment of an agricultural vehicle in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for monitoring the operation of an agricultural sprayer. Specifically, in several embodiments, the sprayer may include a boom assembly and one or more nozzles mounted on the boom assembly. Each nozzle may, in turn, be configured to dispense a spray fan of an agricultural fluid (e.g., a pesticide or a nutrient) as the sprayer travels across a field. In this respect, a controller of the disclosed system may be configured to receive image data depicting one or more of the spray fans dispensed by the nozzle(s). Furthermore, the controller may be configured to analyze received image data to determine one or more parameters associated with a shape of the imaged spray fan(s). For example, in some embodiments, the parameter(s) may include the width(s) of, the angle(s) defined by, and/or the continuity(ies) associated with the imaged spray fan(s).

In accordance with aspects of the present subject matter, the controller may be configured to initiate one or more control actions when the determined spray fan parameter(s) fall outside of an associated predetermined parameter range. Specifically, in several embodiments, the controller may be configured to compare the determined spray fan shape parameter(s) to the associated predetermined parameter range. In one embodiment, the predetermined parameter range(s) may be determined based on the type of (e.g., the tip color of) the nozzle(s) and the pressure of the agricultural fluid supplied to the nozzle(s). When the spray fan parameter(s) fall outside of the associated range, the nozzle(s) may be damaged, partially occluded, fully occluded, not installed, and/or of the incorrect type. In such instances, the controller may be configured to initiate the display of a notification to the operator indicating that the determined spray fan parameter(s) has fallen outside of the associated predetermined parameter range and/or update a spray coverage map. Additionally, the controller may be configured to initiate an adjustment of the ground speed of the sprayer and/or the pressure of the fluid supplied to the nozzle(s) when the spray fan parameter(s) fall outside of the associated range.

Monitoring the operation of the agricultural sprayer using the determined spray fan parameter(s) may ensure that the target application rate of the agricultural substance and/or the desired spray quality is maintained as sprayer travels across the field and field conditions change. In this respect, monitoring the operation of the agricultural sprayer using the determined spray fan parameter(s) may improve agricultural outcomes.

Figure 2:
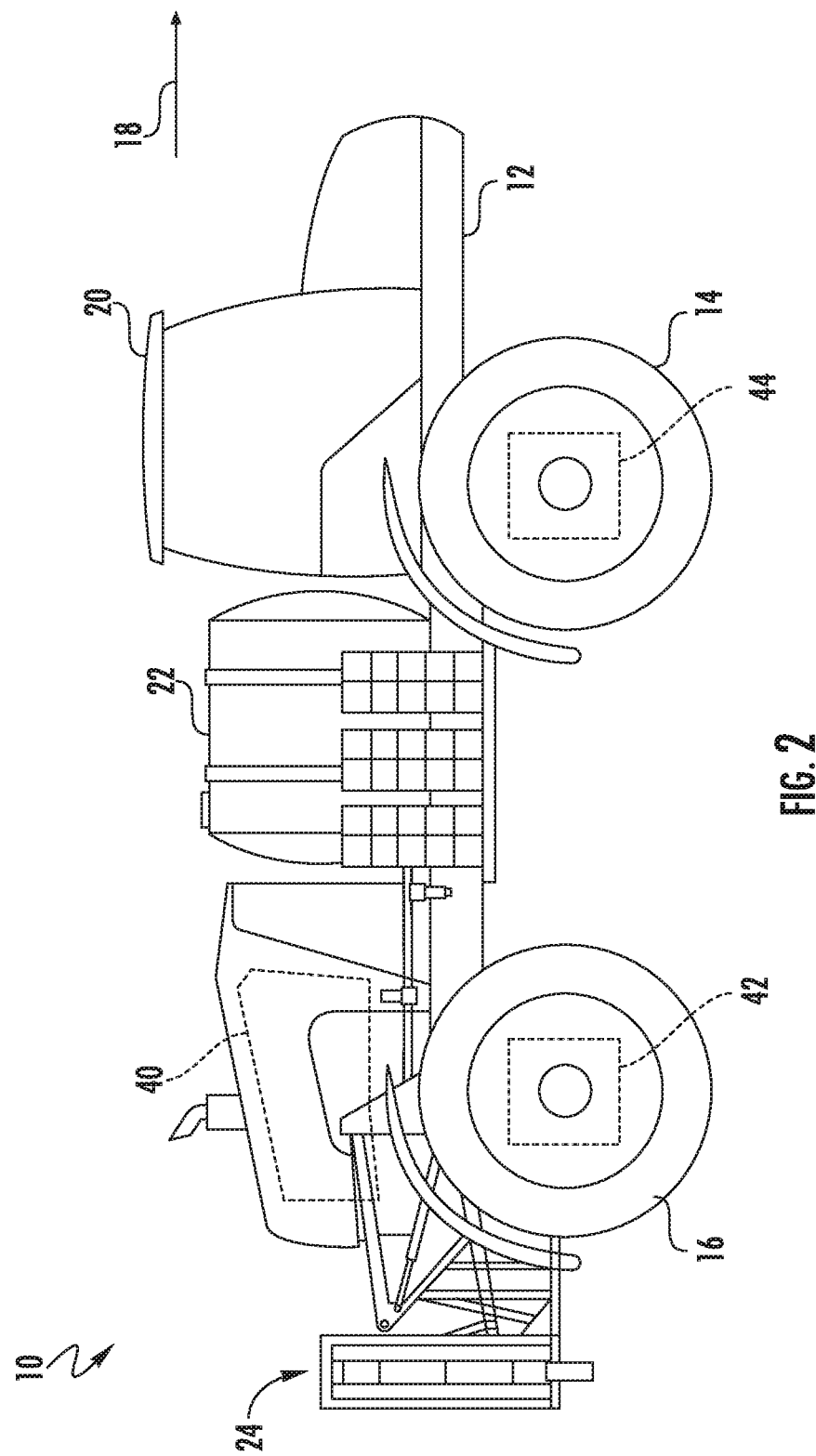
FIG. 2 illustrates a side view of the agricultural vehicle shown in FIG. 1, particularly illustrating various components thereof.

Referring now to the drawings, FIGS. 1 and 2 illustrate differing views of one embodiment of an agricultural sprayer 10 in accordance with aspects of the present subject matter. Specifically, FIG. 1 illustrates a perspective view of the agricultural sprayer 10. Additionally, FIG. 2 illustrates a side view of the agricultural sprayer 10, particularly illustrating various components of the agricultural sprayer 10.

In the illustrated embodiment, the agricultural sprayer 10 is configured as a self-propelled agricultural sprayer. However, in alternative embodiments, the agricultural sprayer 10 may be configured as any other suitable agricultural vehicle that dispenses an agricultural fluid (e.g., a pesticide or a nutrient) while traveling across a field, such as an agricultural tractor and an associated implement (e.g., a towable sprayer, an inter-seeder, a side-dresser, and/or the like).

As shown in FIGS. 1 and 2, the agricultural sprayer 10 includes a frame or chassis 12 configured to support or couple to a plurality of components. For example, a pair of steerable front wheels 14 and a pair of driven rear wheels 16 may be coupled to the frame 12. The wheels 14, 16 may be configured to support the agricultural sprayer 10 relative to the ground and move the sprayer 10 in the direction of travel 18 across the field. Furthermore, the frame 12 may support an operator's cab 20 and a tank 22 configured to store or hold an agricultural fluid, such as a pesticide (e.g., a herbicide, an insecticide, a rodenticide, and/or the like), a fertilizer, or a nutrient. However, in alternative embodiments, the sprayer 10 may include any other suitable configuration. For example, in one embodiment, the front wheels 14 of the sprayer 10 may be driven in addition to or in lieu of the rear wheels 16.

Additionally, the sprayer 10 may include a boom assembly 24 mounted on the frame 12. In general, the boom assembly 24 may extend in a lateral direction 26 between a first lateral end 28 and a second lateral end 30. In one embodiment, the boom assembly 24 may include a center section 32 and a pair of wing sections 34, 36. As shown in FIG. 1, a first wing section 34 extends outwardly in the lateral direction 26 from the center section 32 to the first lateral end 28. Similarly, a second wing section 36 extends outwardly in the lateral direction 26 from the center section 32 to the second lateral end 30. As will be described below, a plurality of nozzles 38 may be mounted on the boom assembly 24 and configured to dispense the agricultural fluid stored in the tank 22 onto the underlying plants and/or soil. However, in alternative embodiments, the boom assembly 24 may include any other suitable configuration.

Referring particularly to FIG. 2, the agricultural sprayer 10 may include one or more devices or components for adjusting the speed at which the sprayer 10 moves across the field in the direction of travel 18. Specifically, in several embodiments, the agricultural sprayer 10 may include an engine 40 and a transmission 42 mounted on the frame 12. In general, the engine 40 may be configured to generate power by combusting or otherwise burning a mixture of air and fuel. The transmission 42 may, in turn, be operably coupled to the engine 40 and may provide variably adjusted gear ratios for transferring the power generated by the engine power to the driven wheels 16. For example, increasing the power output by the engine 40 (e.g., by increasing the fuel flow to the engine 40) and/or shifting the transmission 42 into a higher gear may increase the speed at which the agricultural sprayer 10 moves across the field. Conversely, decreasing the power output by the engine 40 (e.g., by decreasing the fuel flow to the engine 40) and/or shifting the transmission 42 into a lower gear may decrease the speed at which the agricultural sprayer 10 moves across the field.

Additionally, the agricultural sprayer 10 may include one or more braking actuators 44 that, when activated, reduce the speed at which the agricultural sprayer 10 moves across the field, such as by converting energy associated with the movement of the sprayer 10 into heat. For example, in one embodiment, the braking actuator(s) 44 may correspond to a suitable hydraulic cylinder(s) configured to push a stationary frictional element(s) (not shown), such as a brake shoe(s) or a brake caliper(s), against a rotating element(s) (not shown), such as a brake drum(s) or a brake disc(s). However, in alternative embodiments, the braking actuator(s) 44 may any other suitable hydraulic, pneumatic, mechanical, and/or electrical component(s) configured to convert the rotation of the rotating element(s) into heat. Furthermore, although FIG. 2 illustrates one braking actuator 44 provided in operative association with each of the steerable wheels 14, the agricultural sprayer 10 may include any other suitable number of braking actuators 44. For example, in one embodiment, the agricultural sprayer 10 may include one braking actuator 44 provided in operative association with each of the driven wheels 16 in addition to or in lieu of the steerable wheels 14.

Figure 3:
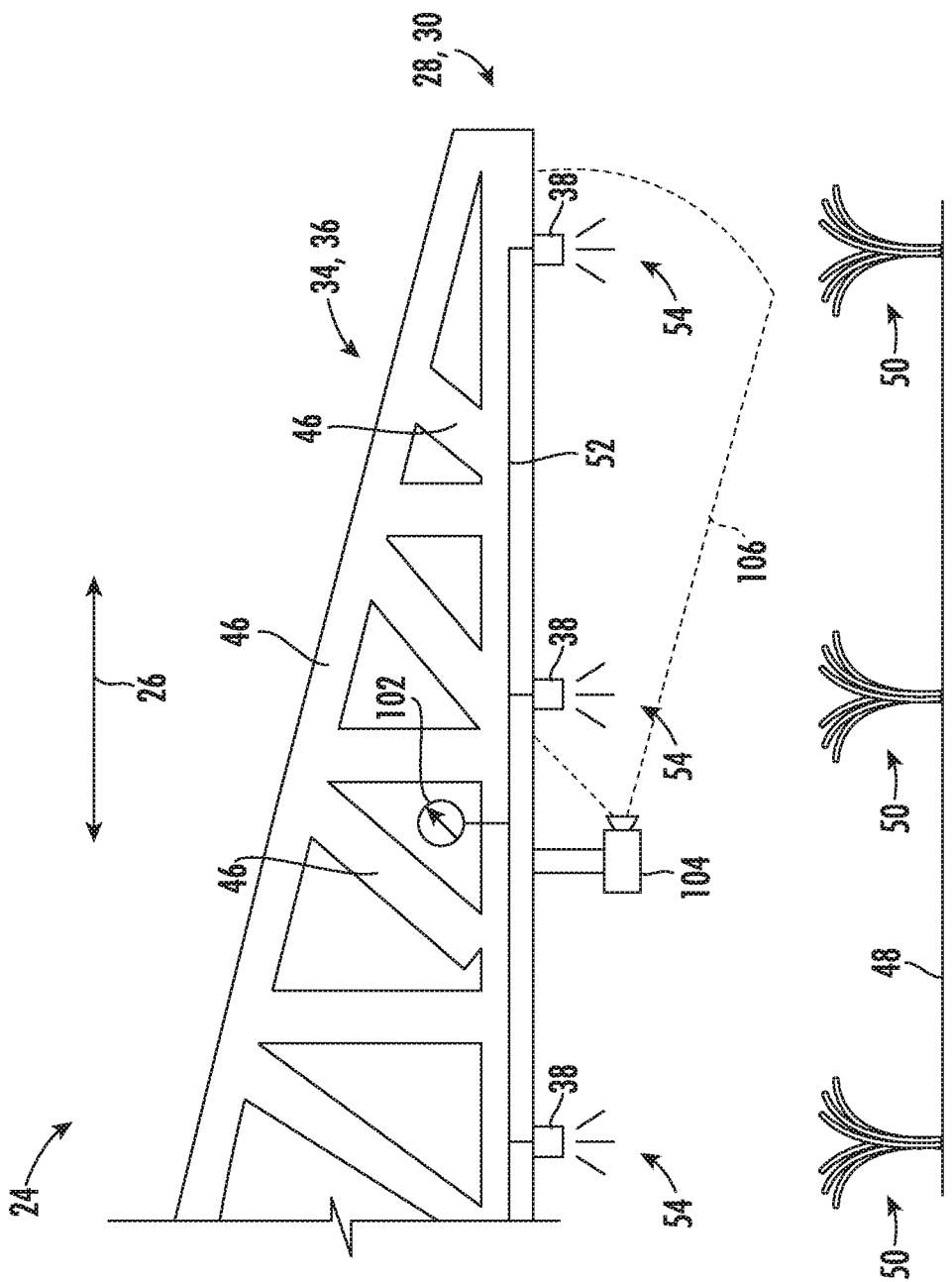
FIG. 3 illustrates a partial front view of one embodiment of a boom assembly of an agricultural sprayer in accordance with aspects of the present subject matter, particularly illustrating a plurality of nozzles supported on the boom.

Referring now to FIG. 3, a partial front view of one embodiment of a boom assembly 24 is illustrated in accordance with aspects of the present subject matter. In general, the boom assembly 24 may include a plurality of structural frame members 46, such as beams, bars, and/or the like. Moreover, as mentioned above, the boom assembly 24 may support a plurality of nozzles 38 (also referred to as spray tips). Each nozzle 38 may, in turn, be configured to dispense the agricultural fluid stored within the tank 22 (FIG. 1) onto the underlying field surface 48 and/or plants 50. Specifically, as shown, the nozzles 38 are mounted on and/or coupled to the frame members 46 such that the nozzles 38 are spaced apart from each other in the lateral direction 26. Furthermore, fluid conduit(s) 52 may fluidly couple the nozzles 38 to the tank 22 and an associated pump (not shown). In this respect, as the sprayer 10 travels across the field in the direction of travel 18 to perform a spraying operation thereon, the pump may pump the agricultural fluid from the tank 22 through the fluid conduit(s) 52 to each of the nozzles 38. The nozzles 38 may, in turn, dispense or otherwise spray a fan 54 of the agricultural fluid onto the underlying field surface 48 and/or plants 50. For example, in one embodiment, the nozzles 38 may correspond to flat fan nozzles configured to dispense a flat fan of the agricultural fluid. However, in alternative embodiments, the nozzles 38 may correspond to any other suitable types of nozzles, such as dual pattern nozzles and/or hollow cone nozzles.

Additionally, in several embodiments, the sprayer 10 may include a pressure sensor 102. In general, the pressure sensor(s) 102 may be configured to capture data indicative of the pressure of the agricultural substance being supplied to the nozzles 38. As such, the pressure sensor(s) 102 may be provided in fluid communication with the fluid conduit(s) 52. For example, the pressure sensor 102 may correspond to a diaphragm pressure sensor, a piston pressure sensor, a strain gauge-based pressure sensor, an electromagnetic pressure sensor, and/or the like.

It should be further appreciated that the configuration of the sprayer 10 \described above and shown in FIGS. 1-3 is provided only to place the present subject matter in an exemplary field of use. Thus, it should be appreciated that the present subject matter may be readily adaptable to any manner of vehicle configuration.

In accordance with aspects of the present subject matter, one or more imaging devices 104 may be installed on the sprayer 10. In general, the imaging device(s) 104 may be configured to capture image data depicting the spray fans 54 dispensed by one or more of the nozzles 38 mounted on the boom assembly 24 as the sprayer 10 travels across the field to perform a spraying operation thereon. As will be described below, a controller may be configured to analyze the captured image data to determine one or more parameters associated with the shape(s) of the imaged spray fan(s) for use in monitoring the operation of the sprayer 10.

In general, the imaging device(s) 104 may correspond to any suitable sensing device(s) configured to detect or capture images or other image-like data depicting the spray fans 54 dispensed by one or more of the nozzles 38 mounted on the boom assembly 24. For example, in several embodiments, the imaging device(s) 104 may correspond to a suitable camera(s) configured to capture three-dimensional images of the spray fan(s) 54 within its field of view (indicated by dashed lines 106). For instance, in one embodiment, the imaging device(s) 104 may correspond to a stereographic camera(s) having two or more lenses with a separate image sensor for each lens to allow the camera(s) to capture stereographic or three-dimensional images. However, in alternative embodiments, the imaging device(s) 104 may correspond to any other suitable sensing device(s) configured to capture image or image-like data, such as a monocular camera(s), a LIDAR sensor(s), and/or a RADAR sensor(s).

The imaging device(s) 104 may be installed at any suitable location(s) that allow the imaging device(s) 104 to capture image data depicting the spray fans 54 dispensed by one or more of the nozzles 38 mounted on the boom assembly 24. For example, in the one embodiment, an imaging device 104 be mounted on each wing boom section 34, 36. As such, each imaging device 104 has an field of view 106 directed at one or more nozzles 38 positioned adjacent to the corresponding lateral end 28, 30 of the boom assembly 24. In such an embodiment, the imaging devices 104 may capture images or other image data depicting the spray fans 54 dispensed by one or more of the nozzles 38 positioned adjacent to lateral end 28, 30 of the boom assembly 24. Such spray fans 54 are particularly difficult for the operator of the sprayer 10 to view from the cab 20. However, in alternative embodiments, the imaging device(s) 104 may be installed at any other suitable location(s), such as on the roof of the cab 20. Additionally, any other suitable number of imaging devices 102 may be installed on the sprayer 10.

Figure 4:
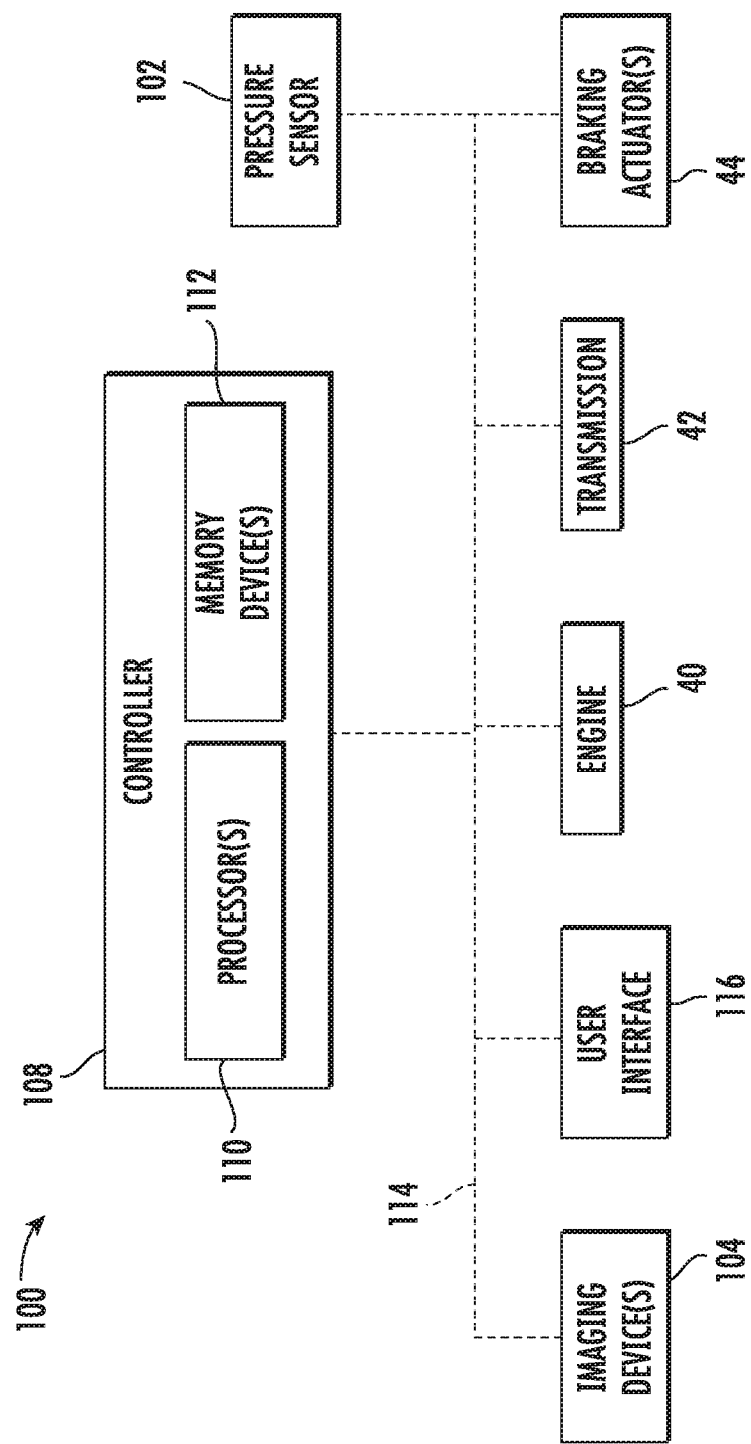
FIG. 4 illustrates a schematic view of one embodiment of a system for monitoring the operation of an agricultural sprayer in accordance with aspects of the present subject matter.

Referring now to FIG. 4, a schematic view of one embodiment of a system 100 for monitoring the operation of an agricultural sprayer is illustrated in accordance with aspects of the present subject matter. In general, the system 100 will be described herein with reference to the agricultural sprayer 10 described above with reference to FIGS. 1-3. However, it should be appreciated by those of ordinary skill in the art that the disclosed system 100 may generally be utilized with agricultural sprayers having any other suitable sprayer configuration.

As shown in FIG. 4, the system 100 may include a controller 108 positioned on and/or within or otherwise associated with the sprayer 10. In general, the controller 108 may comprise any suitable processor-based device known in the art, such as a computing device or any suitable combination of computing devices. Thus, in several embodiments, the controller 108 may include one or more processor(s) 110 and associated memory device(s) 112 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 112 of the controller 108 may generally comprise memory element(s) including, but not limited to, a computer readable medium (e.g., random access memory (RAM)), a computer readable non-volatile medium (e.g., a flash memory), a floppy disc, a compact disc-read only memory (CD-ROM), a magneto-optical disc (MOD), a digital versatile disc (DVD), and/or other suitable memory elements. Such memory device(s) 112 may generally be configured to store suitable computer-readable instructions that, when implemented by the processor(s) 110, configure the controller 108 to perform various computer-implemented functions.

In addition, the controller 108 may also include various other suitable components, such as a communications circuit or module, a network interface, one or more input/output channels, a data/control bus and/or the like, to allow controller 108 to be communicatively coupled to any of the various other system components described herein (e.g., the engine 40, the transmission 42, the braking actuator(s) 44, the pressure sensor 102, and/or the imaging device(s) 104).

For instance, as shown in FIG. 4, a communicative link or interface 114 (e.g., a data bus) may be provided between the controller 108 and the components 40, 42, 44 102, 104 to allow the controller 108 to communicate with such components 40, 42, 44 102, 104 via any suitable communications protocol (e.g., CANBUS).

The controller 108 may correspond to an existing controller(s) of the sprayer 10, itself, or the controller 108 may correspond to a separate processing device. For instance, in one embodiment, the controller 108 may form all or part of a separate plug-in module that may be installed in association with the sprayer 10 to allow for the disclosed systems to be implemented without requiring additional software to be uploaded onto existing control devices of the sprayer 10.

The functions of the controller 108 may be performed by a single processor-based device or may be distributed across any number of processor-based devices, in which instance such devices may be considered to form part of the controller 108. For instance, the functions of the controller 108 may be distributed across multiple application-specific controllers, such as a navigation controller, an engine controller, a transmission controller, and/or the like.

Furthermore, in one embodiment, the system 100 may also include a user interface 116. More specifically, the user interface 116 may be configured to provide feedback (e.g., feedback associated with shapes of the imaged spray fans) to the operator of the sprayer 10. As such, the user interface 116 may include one or more feedback devices (not shown), such as display screens, speakers, warning lights, and/or the like, which are configured to provide feedback from the controller 108 to the operator. The user interface 116 may, in turn, be communicatively coupled to the controller 108 via the communicative link 114 to permit the feedback to be transmitted from the controller 108 to the user interface 116. In addition, some embodiments of the user interface 116 may include one or more input devices (not shown), such as touchscreens, keypads, touchpads, knobs, buttons, sliders, switches, mice, microphones, and/or the like, which are configured to receive user inputs (e.g., input associated with the type of the nozzle 38 installed on the boom assembly 24) from the operator. In one embodiment, the user interface 116 may be mounted or otherwise positioned within the cab 20 of the sprayer 10. However, in alternative embodiments, the user interface 116 may mounted at any other suitable location.

In several embodiments, the controller 108 may be configured to control the operation of the agricultural sprayer 10 such that the sprayer 10 is moved across a field to perform a spraying operation. In general, during the spraying operation, a spray fan of the agricultural fluid stored within the tank 22 of the sprayer 10 is dispensed from one or more nozzles 38 mounted on the boom assembly 24. For example, the controller 108 may be configured to control operation of one more components of the sprayer 10 (e.g., the engine 40, the transmission 42, and/or the pump (not shown)) such that sprayer 10 dispenses one or more spray fans of the agricultural fluid as the sprayer 10 travels across the field in the direction of travel 18.

Additionally, the controller 108 may be configured to determine one or more parameters associated with the shape(s) of one or more spray fans dispensed by the sprayer 10 during the spraying operation. More specifically, as described above, one or more imaging devices 104 may be supported or installed on the sprayer 10 such that the imaging device(s) 104 captures image data depicting the spray fans dispensed by one or more of the nozzles 38 mounted on the boom assembly 24. In this respect, as the sprayer 10 travels across the field to perform the spraying operation thereon, the controller 108 may be configured to receive the captured image data from the imaging device(s) 104 (e.g., via the communicative link 114). The controller 108 may be configured to process/analyze the received image data to determine one or more parameters associated with the shape of the imaged spray fan(s). For example, the controller 108 may be configured to use any suitable image processing techniques to identify the spray fan(s) depicted within the received image data and, subsequently, determine the parameter(s) associated with the shape(s) of the imaged spray fan(s).

Figure 5:
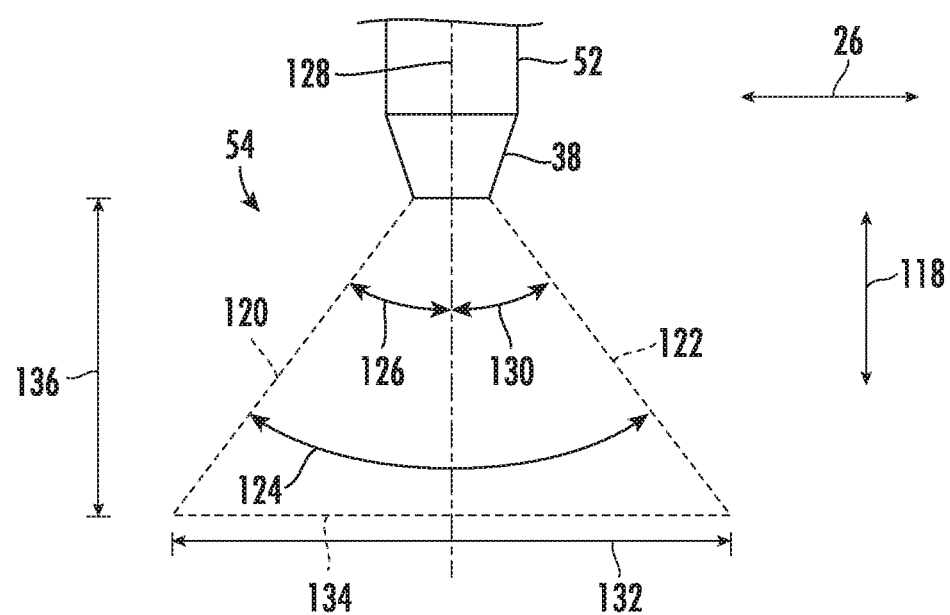
FIG. 5 illustrates a front view of an example spray fan discharged by a nozzle of an agricultural sprayer in accordance with aspects of the present subject matter, particularly illustrating various parameters of the spray fan.

The controller 108 may be configured to determine any suitable parameter(s) associated with the shape(s) of the spray fan(s) depicted in the captured image data. For example, FIG. 5 illustrates a front view of an example spray fan 54 being dispensed from one of the nozzles 38 mounted on the boom assembly 24. In general, the spray fan 54 may be formed of a plurality of droplets (not shown) of the agricultural fluid being dispensed by the nozzle 38 onto the underlying crops 50 and/or the field surface 48. Specifically, as shown, the spray fan 54 extends downward from the nozzle 38 in a vertical direction 118 (e.g., toward the field surface 48 (FIG. 3)). Moreover, as shown, the spray fan 54 extends outward from the nozzle in the lateral direction 26 between a first lateral side (indicated by dashed line 120) and a second lateral side (indicated by dashed line 122). That is, the first and second lateral sides 120, 122 of the spray fan 54 may extend outwardly in the lateral direction 26 and downwardly in the vertical direction 118 from the nozzle 38. As such, the first and second lateral sides 120, 122 of the spray fan 54 may define an oblique angle (indicated by arrow 124) therebetween. In this respect, the spray fan 54 may also define a first oblique angle (indicated by arrow 126) between a lateral centerline 128 of the spray fan 54 and the first lateral side 120 of the spray fan 54. Similarly, the spray fan 54 may also define a second oblique angle (indicated by arrow 130) between the lateral centerline 128 of the spray fan 54 and the second lateral side 122 of the spray fan 54. Thus, the controller 108 may be configured to determine the angle 124 defined between the first and second lateral sides 120, 122 of the spray fan 54, the angle 126 defined between the first lateral side 120 of the spray fan 54 and the lateral centerline 128 of the spray fan 54, and/or the angle 130 defined between the second lateral side 122 of the spray fan 54 and the lateral centerline 128 of the spray fan 54.

Additionally, in several embodiments, the controller 108 may be configured to determine a width (indicated by arrow 132) the spray fan 54. As described above, the nozzle 38 may be configured to dispense the agricultural fluid on the underlying plants 50 and/or the field surface 48. In this respect, the droplets forming the spray fan 54 may fall from the nozzle 38 (e.g., to the pressure of the agricultural fluid in the fluid conduit(s) 54 and gravity) onto the plants 50 and/or the field surface 48. However, the imaged portion of the spray fan 54 generally does not extend from the nozzle 38 to the field surface 48/plants 50. That is, the bottom edge (indicated by dashed line 134) of the imaged portion of the spray fan 54 may be spaced apart from and positioned above the field surface 48 and the plants 50. More specifically, after the droplets have fallen a particular distance (indicated by arrow 136) from the nozzle 38, the droplets may have dispersed sufficiently (e.g., due the laterally outward trajectory of the droplets) to make difficult to accurately identify the portion of the spray fan 54 below the distance 134 using image data. As such, the imaged portion of the spray fan 54 (indicated by dashed lines 120, 122, 134) may extend downward in the vertical direction 118 the distance 136 from the nozzle 38. Thus, in one embodiment, the determined width 132 may correspond to the width of the spray fan 54 at the bottom edge 134 of the imaged portion of the spray fan 54. However, the determined width 132 may correspond to any other suitable width of the spray fan 54, such as the width of the spray fan 54 at a particular distance in from the nozzle 38 in the vertical direction 118.

Moreover, in some embodiments, the controller 108 may be configured to determine the continuity of the spray fan 54. In general, the continuity of the spray fan 54 may refer to the consistency of the droplet presence across the lateral width of the spray fan 54. More specifically, as mentioned above, the spray fan 54 may be formed of a plurality of droplets of the agricultural fluid extending along a lateral width 132 between the first and second lateral sides 120, 122. However, as in certain instances, such as when dirt, dried/congealed agricultural fluid, or other particulate matter is present within the nozzle 38, one or more portions of the spray fan 54 may be missing. That is, in such instances, one or more regions positioned between the first and second lateral sides 120, 122 of the spray fan 54 may be devoid of droplets, thereby effectively dividing the spray fan 54 into two more smaller spray fan portions. As such, the controller 108 may be configured to analyze the imaged spray fan 54 to determine whether droplets are present across the entire lateral width 132 of the spray fan 54. In one embodiment, when the droplets are not present across the entire lateral width 132 of the spray fan 54, the controller 108 may be configured to determine the proportion/percentage of the lateral width 132 of the spray fan 54 devoid of droplets. However, the continuity of the spray fan 54 may be determined in any other suitable manner.

Referring again to FIG. 4, the controller 108 may be configured to initiate one or more control actions based on the determined parameter(s) associated with the shape(s) of the spray fan(s) depicted in the captured image data. Specifically, in several embodiments, the controller 108 may be configured to compare the determined parameter(s) to an associated predetermined threshold value and/or predetermined parameter range. As will be described below, the nozzle(s) 38 may be damaged, occluded, not present, or of the incorrect type (e.g., the incorrect tip color) when the determined parameter(s) differ from the associated threshold value and/or fall outside of the associated parameter range. In such instances, the controller 108 may be configured to initiate one or more control actions associated with improving the quality issues caused by the damaged/occluded/not present/incorrect type nozzle(s) 38.

In one embodiment, the controller 108 may be configured to determine the predetermined parameter range(s) based on the pressure of the agricultural fluid supplied to and the type of the nozzle(s) 38. As described above, the sprayer 10 may include a pressure sensor 102 configured to capture data indicative of the pressure of the agricultural fluid within the fluid conduit(s) 52. In this respect, the controller 108 may be configured to receive the captured data from the pressure sensor 102 (e.g., via the communicative link 114). Moreover, the operator of the sprayer 10 may provide an input to the user interface 116 indicating the type (e.g., the tip color) of the nozzle 38 that has been installed (or was intended to be installed) on the boom assembly 24. As such, the controller 108 may be configured to receive data from the user interface 116 indicative of the nozzle type (e.g., via the communicative link 114). Thereafter, the controller 108 may be configured to process/analyze the data received from the pressure sensor 102 and the user interface 116 to determine an associated threshold value or range for one or more parameters of the spray fan(s) that will be dispensed by the nozzle(s) 38 during a spraying operation. For example, the controller 108 may include a suitable look-up table stored within its memory device(s) 112 that correlates the pressure data and nozzle type data to a predetermined threshold(s)/range(s).

Figure 6:
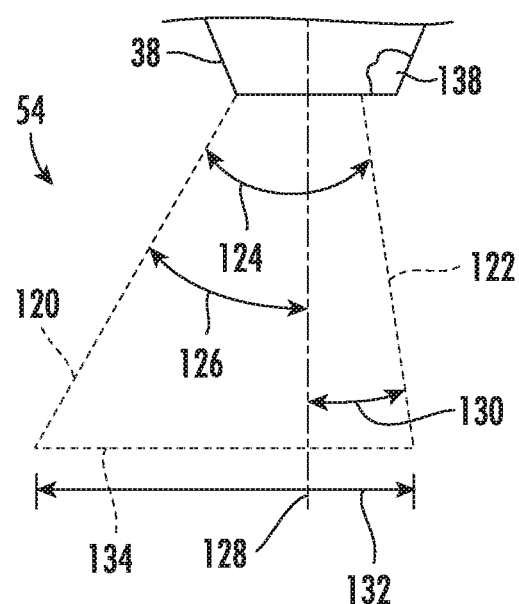
FIG. 6 illustrates a front view of another example spray fan discharged by a damaged or partially occluded nozzle of an agricultural sprayer in accordance with aspects of the present subject matter.

In several embodiments, the controller 108 may be configured to determine when an imaged nozzle 38 is partially occluded based on the associated determined spray fan parameter(s). More specifically, a nozzle 38 may become partially blocked or occluded, such as when the nozzle 38 is damaged (e.g., the nozzle 38 is bent or deformed due to contact with an object) or when dirt, dried/congealed agricultural fluid, or other particulate matter becomes stuck in the nozzle 38 that blocks a portion of the cross-sectional area of the nozzle outlet. In such instances, the shape of the spray fan may deviate from a desired shape such that a portion of the field may not receive the dispensed agricultural substance. For example, FIG. 6 illustrates a nozzle 54 that is partially occluded due to a particulate 138 trapped therein. As shown, the presence of the particulate 138 results in a non-symmetric (i.e., about the lateral centerline 128 of the nozzle 38) spray fan 54. In one embodiment, the controller 108 may be configured to determine that an imaged nozzle 38 is partially occluded when the angle 126 defined between the first lateral side 120 of the associated spray fan 54 and the lateral centerline 128 of the associated spray fan 54 and the angle 130 defined between the second lateral side 122 of the associated spray fan 54 and the lateral centerline 128 of the associated spray fan 54 differ by more than a predetermined amount. In another embodiment, the controller 108 may be configured to determine an imaged nozzle 38 is partially occluded when the angle 124 defined between the first and second lateral sides 120, 122 of the associated spray fan 54 falls below of a predetermined value. In a further embodiment, the controller 108 may be configured to determine an imaged nozzle 38 is partially occluded when the width 132 of the associated spray fan 54 falls below a predetermined value. In yet another embodiment, the controller 108 may be configured to determine an imaged nozzle 38 is partially occluded when the proportion of the lateral width 132 of the spray fan 54 devoid of droplets exceeds a predetermined value. However, the controller 108 may be configured to determine an imaged nozzle 38 is partially occluded based on the continuity of the spray fan 54 in any other suitable manner. Moreover, in alternative embodiments, the controller 108 may be configured to determine when an imaged nozzle 38 is partially occluded in any other suitable manner.

Furthermore, in several embodiments, the controller 108 may be configured to determine when an imaged nozzle 38 is completely occluded based on the associated determined spray fan parameter(s). More specifically, a nozzle 38 may become completely blocked or occluded, such as when the nozzle 38 is damaged (e.g., the nozzle 38 is bent or deformed due to contact with an object) or when dirt, dried/congealed agricultural fluid, or other particulate matter become stuck in the nozzle 38 that prevents any agricultural fluid from exiting the nozzle 38. In this respect, the controller 108 may be configured to determine that an imaged nozzle 38 is entirely occluded when no associated spray fan 54 is present (e.g., the associated spray fan shape parameter is zero).

Additionally, the controller 108 may be configured to determine when a nozzle 38 has not been installed or is otherwise missing from an imaged portion of the boom assembly 24. More specifically, when a nozzle 38 is not installed in the boom assembly 24, the agricultural fluid may be discharged from the conduit(s) 52 in a stream as opposed to a fan of droplets. As such, in one embodiment, the controller 108 may be configured to determine that a nozzle 38 is missing in an imaged portion of the boom assembly 24 when the angle 124 defined between the first and second lateral sides 120, 122 of a spray fan 54 (i.e., the stream of agricultural fluid) falls below of a predetermined value. In a further embodiment, the controller 108 may be configured to a nozzle 38 is missing in an imaged portion of the boom assembly 24 when the width 132 of a spray fan 54 (i.e., the stream of agricultural fluid) falls below a predetermined value. However, in alternative embodiments, the controller 108 may be configured to determine when a nozzle 38 is missing in an imaged portion of the boom assembly 24 in any other suitable manner.

Furthermore, the controller 108 may be configured to determine when an incorrect nozzle 38 has been installed on the boom assembly 24. More specifically, each type of nozzle (e.g., each nozzle tip color) may have a predetermined spray fan shape (e.g., one or more predetermined spray fan parameter ranges). In this respect, when an incorrect nozzle 38 has been installed, the shape of the spray fan may deviate from a desired shape, which may, in turn, result in the agricultural fluid being dispensed at an undesired application rate. As such, in one embodiment, the controller 108 may be configured to determine that an incorrect nozzle 38 has been installed when the angle 124 defined between the first and second lateral sides 120, 122 of the associated spray fan 54 falls outside of a predetermined range. In another embodiment, the controller 108 may be configured to determine an incorrect nozzle 38 has been installed when the width 132 of the associated spray fan 54 falls outside of a predetermined range. However, in alternative embodiments, the controller 108 may be configured to determine when an incorrect nozzle 38 has been installed in any other suitable manner.

Moreover, the controller 108 may be configured to determine when there is a difference in the shapes of two or more spray fans. More specifically, in certain instances, the shapes of two or spray fans may differ, such as when different types of nozzles 38 are installed on boom assembly 24. As such, in several embodiments, the controller 108 may be configured analyze the received image data to determine a parameter(s) associated with the shapes of two or more imaged spray fans 54. Thereafter, the controller 108 may be configured to compare the determined parameters associated within the imaged spray fan 54. When the spray fan parameters differ by more than a predetermined amount (thereby indicating that the shapes of the imaged spray fans 54 differ), the controller 108 may be configured to initiate one or more control actions.

Referring again to FIG. 4, as mentioned above, the controller 108 may be configured to initiate one or more control actions when a determined spray fan shape parameter(s) falls outside of a predetermined range, differs from a predetermined threshold value, and/or differs from the spray fan shape parameter associated with another nozzle 38. In one embodiment, in such instances, the controller 108 may be configured to notify the operator of sprayer 10. Specifically, in such an embodiment, the controller 108 may be configured to transmit instructions to the user interface 116 (e.g., via the communicative link 114). The instructions may, in turn, instruct the user interface 116 to provide a visual or audible notification or indicator to the operator. Such notification may simply indicate that a determined spray fan shape parameter(s) falls outside of a predetermined range, differs from a predetermined threshold value, and/or differs from the spray fan shape parameter associated with another nozzle 38. Alternatively, the notification may provide an indication of whether an imaged nozzle 38 (and, optionally, which one) is partially occluded, fully occluded, not present, of an incorrect type, or has a different spray fan shape than another nozzle 38. Thereafter, the operator may then choose to initiate any suitable corrective action he/she believes is necessary, such as adjusting changing one or more nozzles 38 installed on the boom assembly 24.

Moreover, in one embodiment, the control action(s) may include updating a spray coverage map. More specifically, the memory device(s) 112 of the controller 108 may be configured to store a spray coverage map associated with the spraying operation performed on the field. The map may, in turn, provide an indication of the target application rate of the agricultural fluid at various locations within the field. When the determined spray fan parameter(s) differ from the associated threshold value and/or fall outside of the associated parameter range (thereby indicating the nozzle(s) 38 may be damaged, occluded, not present, or of the incorrect type), the actual application rate of the agricultural fluid during the spraying operation may differ from the target application rate indicated in the map. As such, the controller 108 may be configured to calculate the actual application rate (e.g., based on the presence of the damaged, occluded, not present, or of the incorrect type of the nozzle(s) 38) and update the spray coverage map accordingly.

Additionally, in one embodiment, the control action(s) may include adjusting the ground speed of the sprayer 10. Reducing the ground speed of the spray 10 may, in turn, improve the shape(s) of the spray fan(s) 54 dispensed by the nozzle(s) 38, particularly during windy conditions. For example, in such an embodiment, the controller 108 may be configured to control the operation of the engine 40, the transmission 42, and/or the braking actuator(s) 44 to execute the desired adjustment to the ground speed of the vehicle 10. Specifically, the controller 108 may be configured to transmit control signals to such components 40, 42, 44 (e.g., via the communicative link 114). The control signals may, in turn, instruct the components 40, 42, 44 to adjust their operation to increase or decrease the ground speed of the sprayer 10 as desired.

Furthermore, in one embodiment, the control action(s) may include adjusting the pressure of the agricultural fluid supplied to the nozzle(s) 38. For example, increasing the pressure of the agricultural fluid supplied to a nozzle 38 may remove a particulate (e.g., the particulate 138) partially occluding the nozzle 38 and/or increase to the amount of agricultural fluid dispensed by the nozzle 38. In such an embodiment, the controller 108 may be configured to control the operation of the pump (not shown) to execute the desired adjustment to the pressure of the agricultural fluid supplied to the nozzle(s) 38. Specifically, the controller 108 may be configured to transmit control signals to the pump instructing the pump to adjust its operation to increase or decrease the pressure of the agricultural fluid as desired.

Figure 7:
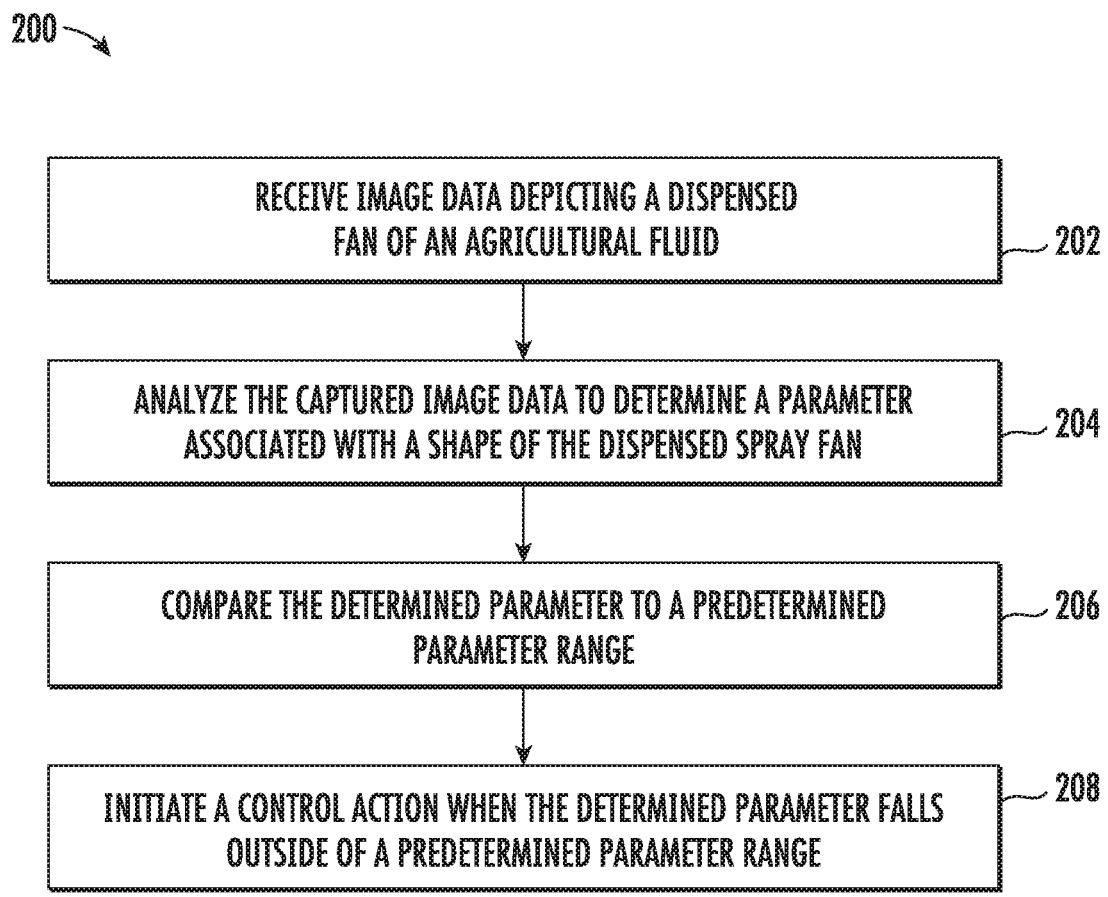
FIG. 7 illustrates a flow diagram of one embodiment of a method for monitoring the operation of an agricultural sprayer in accordance with aspects of the present subject matter.

Referring now to FIG. 7, a flow diagram of one embodiment of a method 200 for monitoring the operation of an agricultural sprayer is illustrated in accordance with aspects of the present subject matter. In general, the method 200 will be described herein with reference to the agricultural sprayer 10 and the system 100 described above with reference to FIGS. 1-6. However, it should be appreciated by those of ordinary skill in the art that the disclosed method 200 may generally be implemented with any agricultural sprayer having any other suitable sprayer configuration and/or with any system having any other suitable system configuration. In addition, although FIG. 7 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 7, at (202), the method 200 may include receiving, with one or more computing devices, image data depicting a dispensed fan of the agricultural fluid. For instance, as described above, the controller 108 may be configured to receive image data depicting a dispensed fan of the agricultural fluid from one or more imaging device(s) 104 installed on the sprayer 10.

Additionally, at (204), the method 200 may include analyzing, with the one or more computing devices, the received image data to determine a parameter associated with a shape of the dispensed spray fan. For instance, as described above, the controller 108 may be configured to analyze the received image data to determine a parameter associated with the shape of the dispensed spray fan.

Moreover, as shown in FIG. 7, at (206), the method 200 may include comparing, with the one or more computing devices, the determined parameter to a predetermined parameter range. For instance, as described above, the controller 108 may be configured to compare the determined parameter to a predetermined parameter range.

Furthermore, at (208), the method 200 may include initiating, with the one or more computing devices, a control action when the determined parameter falls outside of a predetermined parameter range. For instance, as described above, the controller 108 may be configured to initiate a control action when the determined parameter falls outside of a predetermined parameter range. In one embodiment, in such instances, the controller 108 may be configured to control the operation of the engine 40, the transmission 42, and/or the braking actuator(s) 44 to adjust the ground speed at which the sprayer 10 travels across the field.

It is to be understood that the steps of the method 200 are performed by the controller 108 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 108 described herein, such as the method 200, is implemented in software code or instructions which are tangibly stored on a tangible computer readable medium. The controller 108 loads the software code or instructions via a direct interface with the computer readable medium or via a wired and/or wireless network. Upon loading and executing such software code or instructions by the controller 108, the controller 108 may perform any of the functionality of the controller 108 described herein, including any steps of the method 200 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A system for monitoring an operation of an agricultural sprayer, the system comprising:
   a boom;
   a nozzle mounted on the boom, the nozzle configured to dispense a spray fan of an agricultural fluid as the agricultural sprayer travels across a field;
   an imaging device configured to capture image data depicting the dispensed spray fan of the agricultural fluid; and
   a controller communicatively coupled to the imaging device, wherein the controller:
      determines an angle of the dispensed spray fan based on the captured image data, the angle of the dispensed spray fan being defined between a first side of the dispensed spray fan and either a second side of the dispensed spray fan or a centerline of the dispensed spray fan;
      compares the determined angle of the dispensed spray fan to a predetermined angle range; and
      initiates a control action to adjust the operation of the agricultural sprayer when the determined angle of the dispensed spray fan falls outside of the predetermined angle range.

2. The system of claim 1, wherein the control action comprises providing a notification to an operator of the agricultural sprayer indicating that the determined angle of the dispensed spray fan has fallen outside of the predetermined angle range.

3. The system of claim 1, wherein the control action comprises adjusting a ground speed at which the agricultural sprayer travels across the field.

4. The system of claim 1, wherein the control action comprises updating a spray coverage map.

5. The system of claim 1, wherein the control action comprises adjusting a pressure of the agricultural fluid supplied to the nozzle.

6. The system of claim 1, wherein the angle is defined between the first side of the dispensed spray fan and the second side of the dispensed spray fan.

7. The system of claim 1, wherein the angle is defined between the first side of the dispensed spray fan and the centerline of the dispensed spray fan.

8. The system of claim 7, wherein the angle corresponds to a first angle and wherein the controller further:
   determines a second angle of the spray fan, the second angle being defined between the second side of the spray fan and the centerline of the spray fan based on the captured image data;

compares the determined first angle and the determined second angle; and initiates the control action when the first angle differs from the second angle.

9. The system of claim 1, wherein the nozzle corresponds to a first nozzle configured to dispense a first fan of the agricultural fluid, the system further comprising:

a second nozzle mounted on the boom, the second nozzle configured to dispense a second fan of the agricultural fluid, the captured image data depicting the second dispensed spray fan, wherein the controller further:

determines an angle of the second dispensed spray fan based on the captured image data, the angle of the second dispensed spray fan being defined between a first side of the second dispensed spray fan and either a second side of the second dispensed spray fan or a centerline of the second dispensed spray fan;

compares the determined angle defined by the first dispensed spray fan and the determined angle defined by the second dispensed spray fan; and initiates the control action when the determined angle defined by the first dispensed spray fan differs from the determined angle defined by the second dispensed spray fan.

10. The system of claim 1, further comprising:

a pressure sensor configured to capture data indicative of a pressure of the agricultural fluid being supplied to the nozzle, wherein the controller further:

receives an input from an operator of the agricultural sprayer associated with a type of the nozzle mounted on the boom;

determines the pressure of the agricultural fluid being supplied to the nozzle based on the data captured by the pressure sensor; and determines the predetermined angle range based on the determined pressure and the received input.

11. A method for monitoring an operation of an agricultural sprayer, the agricultural sprayer including a nozzle configured to dispense a spray fan of an agricultural fluid as the agricultural sprayer travels across a field, the method comprising:

receiving, with one or more computing devices, image data depicting the dispensed spray fan of the agricultural fluid;

determining, with the one or more computing devices, an angle of the dispensed spray fan based on the received image data, the angle of the dispensed spray fan being defined between a first side of the dispensed spray fan and either a second side of the dispensed spray fan or a centerline of the dispensed spray fan;

comparing, with the one or more computing devices, the determined angle of the dispensed spray fan to the predetermined angle range; and initiating, with the one or more computing devices, a control action associated with adjusting the operation of the agricultural sprayer when the determined angle of the dispensed spray fan falls outside of the predetermined angle range.

12. The method of claim 11, wherein the control action comprises providing a notification to an operator of the agricultural sprayer indicating that the determined angle of the dispensed spray fan has fallen outside of the predetermined angle value.

13. The method of claim 11, wherein the control action comprises adjusting a ground speed at which the agricultural sprayer travels across the field.

14. The method of claim 11, wherein the control action comprises updating a spray coverage map.

15. The method of claim 11, wherein the control action comprises adjusting a pressure of the agricultural fluid supplied to the nozzle.

16. A system for monitoring an operation of an agricultural sprayer, the system comprising:

a boom;

a nozzle mounted on the boom, the nozzle configured to dispense a spray fan of an agricultural fluid as the agricultural sprayer travels across a field;

an imaging device configured to capture image data depicting the dispensed spray fan of the agricultural fluid; and a controller communicatively coupled to the imaging device, wherein the controller:

determines an angle of the dispensed spray fan based on the captured image data, the angle of the dispensed spray fan being defined between a first side of the dispensed spray fan and either a second side of the dispensed spray fan or a centerline of the dispensed spray fan;

compares the determined angle of the dispensed spray fan to a predetermined angle range; and initiates at least one of an adjustment to a ground speed at which the agricultural sprayer travels across the field or an adjustment to a pressure of the agricultural fluid supplied to the nozzle when the determined angle of the dispensed spray fan falls outside of the predetermined angle range.

* * * * *